(12) United States Patent
Seay et al.

(10) Patent No.: US 7,437,850 B1
(45) Date of Patent: Oct. 21, 2008

(54) MAG FLOAT

(76) Inventors: Robert C. Seay, Box 161, Valley View, TX (US) 76272; Kevin L Sandmann, 820 Triangle Rd., Valley View, TX (US) 76272

( * ) Notice: Subject to any disclaimer, the term of this patent is extended or adjusted under 35 U.S.C. 154(b) by 0 days.

(21) Appl. No.: 11/879,082

(22) Filed: Jul. 16, 2007

Related U.S. Application Data

(60) Provisional application No. 60/833,007, filed on Jul. 25, 2006.

(51) Int. Cl.
*A01K 93/00* (2006.01)
(52) U.S. Cl. ............... 43/44.88; 43/44.91; 43/44.87
(58) Field of Classification Search .......... 43/44.88, 43/44.91, 44.9, 44.87, 42.23
See application file for complete search history.

(56) References Cited

U.S. PATENT DOCUMENTS

| | | | | |
|---|---|---|---|---|
| 250,848 | A * | 12/1881 | Smith ............... | 43/44.88 |
| 717,237 | A * | 12/1902 | Marsters ............ | 43/44.88 |
| 1,122,359 | A * | 12/1914 | Bissett ............. | 43/44.91 |
| 1,468,720 | A * | 9/1923 | Low ................. | 43/44.91 |
| 2,208,240 | A * | 7/1940 | Arnesen et al. ...... | 43/44.88 |
| 2,221,437 | A * | 11/1940 | Allison ............. | 43/44.88 |
| 2,226,331 | A * | 12/1940 | Allison ............. | 43/44.88 |
| 2,254,800 | A * | 9/1941 | Furdas .............. | 43/44.91 |
| 2,274,380 | A * | 2/1942 | Pool ................ | 43/44.88 |
| 2,281,204 | A * | 4/1942 | Raymond ............. | 242/147 M |
| 2,293,294 | A * | 8/1942 | Heckman ............. | 43/44.88 |
| 2,326,510 | A * | 8/1943 | Worden .............. | 43/44.88 |
| 2,376,958 | A * | 5/1945 | Chapman ............. | 43/44.88 |
| 2,496,334 | A * | 2/1950 | Chapman ............. | 43/44.88 |
| 2,503,793 | A * | 4/1950 | Breemes ............. | 43/44.91 |
| 2,581,259 | A * | 1/1952 | Keen ................ | 43/44.91 |
| 2,581,260 | A * | 1/1952 | Keen ................ | 43/44.87 |
| 2,597,737 | A * | 5/1952 | Kay et al. .......... | 43/44.88 |
| 2,607,154 | A * | 8/1952 | Martens ............. | 43/44.91 |
| 2,611,211 | A * | 9/1952 | Stockton ............ | 43/44.91 |
| 2,647,705 | A * | 8/1953 | Gilmore ............. | 242/147 M |
| 2,654,177 | A * | 10/1953 | Cope et al. ......... | 43/44.88 |
| 2,694,878 | A * | 11/1954 | Martens ............. | 43/44.91 |
| 2,722,768 | A * | 11/1955 | Fleetwood ........... | 43/44.91 |
| 2,775,056 | A * | 12/1956 | Sneed ............... | 43/44.91 |
| 2,847,792 | A * | 8/1958 | Kuhlmann ............ | 43/44.9 |

(Continued)

FOREIGN PATENT DOCUMENTS

DE      3715937 A1 * 11/1988

(Continued)

*Primary Examiner*—Darren W Ark

(57) ABSTRACT

A fishing float includes a magnetic lock mechanism within the float to allow for the adjustment of a fishing line through the float to adjust the length of the fishing line through the float to select the appropriate depth of the bait or lure below the fishing float without having to reel in the bait and adjust the depth from the shore. The float, once engaged by a quick tug on the fishing line, is locked into place by a rocking magnetic lock member engaging a serrated transverse locking pin across a longitudinal line channel, capturing fishing line placed between the magnetic lock member and the locking pin, the lock member and the locking being magnetically attracted to each other. The magnetic lock member is disengaged by a quick tug on the fishing line causing a pivotal trigger to release the magnetic lock member from the locking pin allowing the fishing line to move freely through the line channel.

2 Claims, 3 Drawing Sheets

U.S. PATENT DOCUMENTS

| | | | | |
|---|---|---|---|---|
| 2,888,771 A * | 6/1959 | Stephens et al. | ............ | 43/44.88 |
| 2,908,991 A * | 10/1959 | Cummings et al. | ......... | 43/44.88 |
| 2,937,469 A * | 5/1960 | Tiede | ........................ | 43/44.88 |
| 2,983,067 A * | 5/1961 | Saywell, Jr. | ................. | 43/44.88 |
| 2,984,040 A * | 5/1961 | Fogaley | ..................... | 43/44.91 |
| 3,012,359 A * | 12/1961 | Foster | ....................... | 43/44.91 |
| 3,032,913 A * | 5/1962 | Voll | ........................... | 43/44.91 |
| 3,106,034 A * | 10/1963 | Jonassen | .................... | 43/44.91 |
| 3,158,953 A * | 12/1964 | Filler | ......................... | 43/43.14 |
| 3,161,983 A * | 12/1964 | Stanek | ........................ | 43/44.9 |
| 3,180,051 A * | 4/1965 | Freeman | .................... | 43/44.91 |
| 3,192,661 A * | 7/1965 | Tyrrell | ........................ | 43/44.88 |
| 3,255,549 A * | 6/1966 | Riley | .......................... | 43/44.88 |
| 3,341,965 A * | 9/1967 | Purcella | ...................... | 43/44.88 |
| 3,353,294 A * | 11/1967 | Mundorff et al. | .......... | 43/44.88 |
| 3,370,376 A * | 2/1968 | Winn | ......................... | 43/44.88 |
| 3,381,407 A * | 5/1968 | McDougall | ................ | 43/44.88 |
| 3,443,336 A * | 5/1969 | Reese | ........................ | 43/44.88 |
| 3,455,056 A * | 7/1969 | Cultrera | ..................... | 43/44.91 |
| 3,626,628 A * | 12/1971 | Weimer | ...................... | 43/42.22 |
| 3,659,372 A * | 5/1972 | Cullen | ........................ | 43/44.88 |
| 3,667,149 A * | 6/1972 | Daigle | ........................ | 43/44.91 |
| 3,688,431 A * | 9/1972 | Nichols et al. | ............. | 43/44.88 |
| 3,733,734 A * | 5/1973 | Hysaw | ........................ | 43/44.9 |
| 3,750,324 A * | 8/1973 | Verheij | ....................... | 43/44.88 |
| 3,800,461 A * | 4/1974 | Jacobi | ........................ | 43/44.88 |
| 3,999,324 A * | 12/1976 | Wagner | ..................... | 43/44.91 |
| 4,030,223 A * | 6/1977 | Loesch et al. | ............... | 43/44.88 |
| 4,047,319 A * | 9/1977 | Duncan | ...................... | 43/44.91 |
| 4,195,435 A * | 4/1980 | Kern | .......................... | 43/44.9 |
| 4,221,068 A * | 9/1980 | Roemer, Jr. | ................. | 43/44.91 |
| 4,571,874 A * | 2/1986 | Smaw | ........................ | 43/44.91 |
| 4,757,633 A * | 7/1988 | Van Cleve | .................... | 43/26.1 |
| 4,757,635 A * | 7/1988 | Cole | ........................... | 43/44.88 |
| 4,872,281 A * | 10/1989 | Burgess | ..................... | 43/43.12 |
| 4,905,401 A * | 3/1990 | Fukumoto | ................... | 43/43.12 |
| 5,117,576 A * | 6/1992 | Lasiter | ....................... | 43/44.91 |
| 5,177,894 A * | 1/1993 | Dunsford | ................... | 43/43.12 |
| 5,361,532 A * | 11/1994 | Moff | .......................... | 43/44.91 |
| 5,557,878 A * | 9/1996 | Ross | .......................... | 43/44.87 |
| 5,631,352 A * | 5/1997 | Lauk | .......................... | 534/797 |
| 5,713,152 A * | 2/1998 | Domack | ..................... | 43/44.87 |
| 6,247,263 B1* | 6/2001 | Tiede et al. | ................. | 43/44.88 |
| 6,378,241 B1* | 4/2002 | Straub | ........................ | 43/44.91 |
| 6,550,179 B1* | 4/2003 | Seay | ........................... | 43/44.88 |
| 6,574,910 B1* | 6/2003 | Verdura Pares | ............ | 43/44.88 |
| 6,880,288 B1* | 4/2005 | Hanes | ........................ | 43/44.87 |

FOREIGN PATENT DOCUMENTS

| | | | | |
|---|---|---|---|---|
| GB | 2073562 A | * | 10/1981 | |
| JP | 03112430 A | * | 5/1991 | |
| JP | 08228649 A | * | 9/1996 | |
| JP | 09028256 A | * | 2/1997 | |
| JP | 09238604 A | * | 9/1997 | |
| JP | 2004057092 A | * | 2/2004 | |
| JP | 2004275164 A | * | 10/2004 | |
| JP | 2005124555 A | * | 5/2005 | |
| JP | 2005278494 A | * | 10/2005 | |
| JP | 2006223282 A | * | 8/2006 | |
| WO | WO 8505249 A1 | * | 12/1985 | |
| WO | WO 9300802 A1 | * | 1/1993 | |
| WO | WO 9524123 A1 | * | 9/1995 | |
| WO | WO 9902031 A1 | * | 1/1999 | |
| WO | WO 02091822 A1 | * | 11/2002 | |

\* cited by examiner

MAG FLOAT

CROSS REFERENCE TO RELATED APPLICATIONS

U.S. Pat. No. 6,550,179 to Robert C. Seay, who is a common inventor and one of two applicants in this Nonprovisional patent application. Applicants also claim the benefit of Provisional Patent Application No. 60/833,007, filed Jul. 25, 2006, by the same two inventors.

BACKGROUND OF THE INVENTION

1. Field of Invention

The invention relates to a fishing float having a magnetic lock mechanism within the float to allow for the adjustment of a fishing line through the float to adjust the length of the fishing line through the float to select the appropriate depth of the bait or lure below the fishing float without having to reel in the bait and adjust the depth from the shore. The float, once engaged by a quick tug on the fishing line, is locked into place by a rocking magnetic lock member engaging a serrated transverse locking pin across a longitudinal line channel, capturing fishing line placed between the magnetic lock member and the locking pin, the lock member and the locking being magnetically attracted to each other. The magnetic lock member is disengaged by a quick tug on the fishing line causing a pivotal trigger to release the magnetic lock member from the locking pin allowing the fishing line to move freely through the line channel.

2. Description of Prior Art

The following United States patents were discovered and are disclosed within this application for utility patent. All relate to fishing floats, with some having adjustable means within the float. In U.S. Pat. No. 5,361,532 to Moff, a fishing float is disclosed having a metal ball and a magnetic ring which allows for the bobber to be cast, then fill with water orienting the device in a vertical position causing the ball to travel to the end of a hollow tube within which it is situated, catching the fishing line run through the tube between the ball and the tube opening, locking the line into position.

Finger activated adjustable bobbers, knot adjustable bobbers, and snap-together adjustable bobbers are disclosed in respective U.S. Pat. Nos. 4,047,319 to Duncan, 4,195,435 to Kern and 5,713,152 to Domack, which have manual adjustment means. A remote adjustable means for a fishing bobber using a ball within a cylinder to trap the fishing line between the ball and the inner cylinder wall is disclosed in U.S. Pat. No. 5,117,576 to Lasiter. U.S. Pat. No. 4,030,223 to Loesch discloses an ice fishing line control apparatus that causes an arm to drop when the line has a bite or downward tug releasing a magnetically attached arm.

A previous patent issued to this applicant, which would not be considered prior art affecting the present application, involved a similar pivotal locking means having a magnetic wedge engaging a lock channel accepting the magnetic wedge to engage and retain fishing line through the fishing float which engaged and released with the tug of the fishing line. It also had a weighted internal ball within a ball channel that adjusted the wedge within the float to assist in the engagement and disengagement of the magnetic wedge.

Subsequent to the issuance of the inventor's prior patent, two other patent, U.S. Pat. No. 6,880,288 to Hanes and U.S. Pat. No. 6,574,910 to Vendura Pares, involve devices that release a fishing weight from a bobber of from a fishing line. None of them provide the same elements as the current invention, other than the applicant prior patent, comprises a magnetic means between two locking elements to retain a fishing line, the magnetic catch being release and reactivated by minor tugs on the fishing line. The current invention discloses a slightly different and distinct magnetic means and two different locking elements and a release trigger device.

SUMMARY OF THE INVENTION

The primary objective of the invention is to provide a fishing float having an inner release mechanism allowing for adjustment of the fishing line to a variety of depths without having to reel in the fishing line.

A second objective is to provide the device with a magnetic catch means to hold and release the line traveling through the magnetic catch means.

A third objective is to provide the device with a means to engage and disengage the magnetic catch with a light tug on the fishing line from the shore by the fisherman.

DESCRIPTION OF THE DRAWINGS

The following drawings are submitted with this utility patent application.

DESCRIPTION OF THE PREFERRED EMBODIMENT

Figure 1:
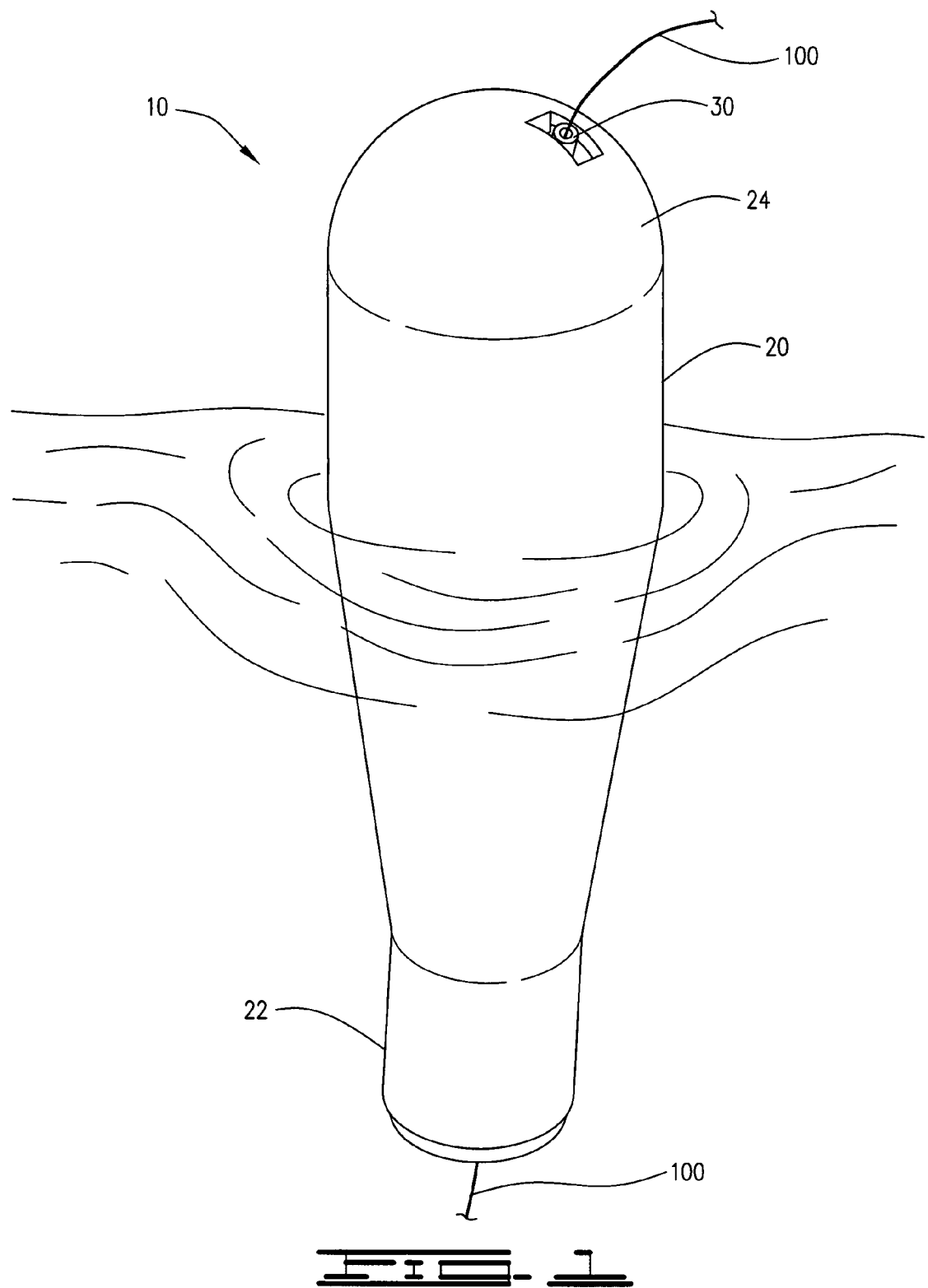
FIG. 1 is a perspective view of the fishing float.
Figure 2:
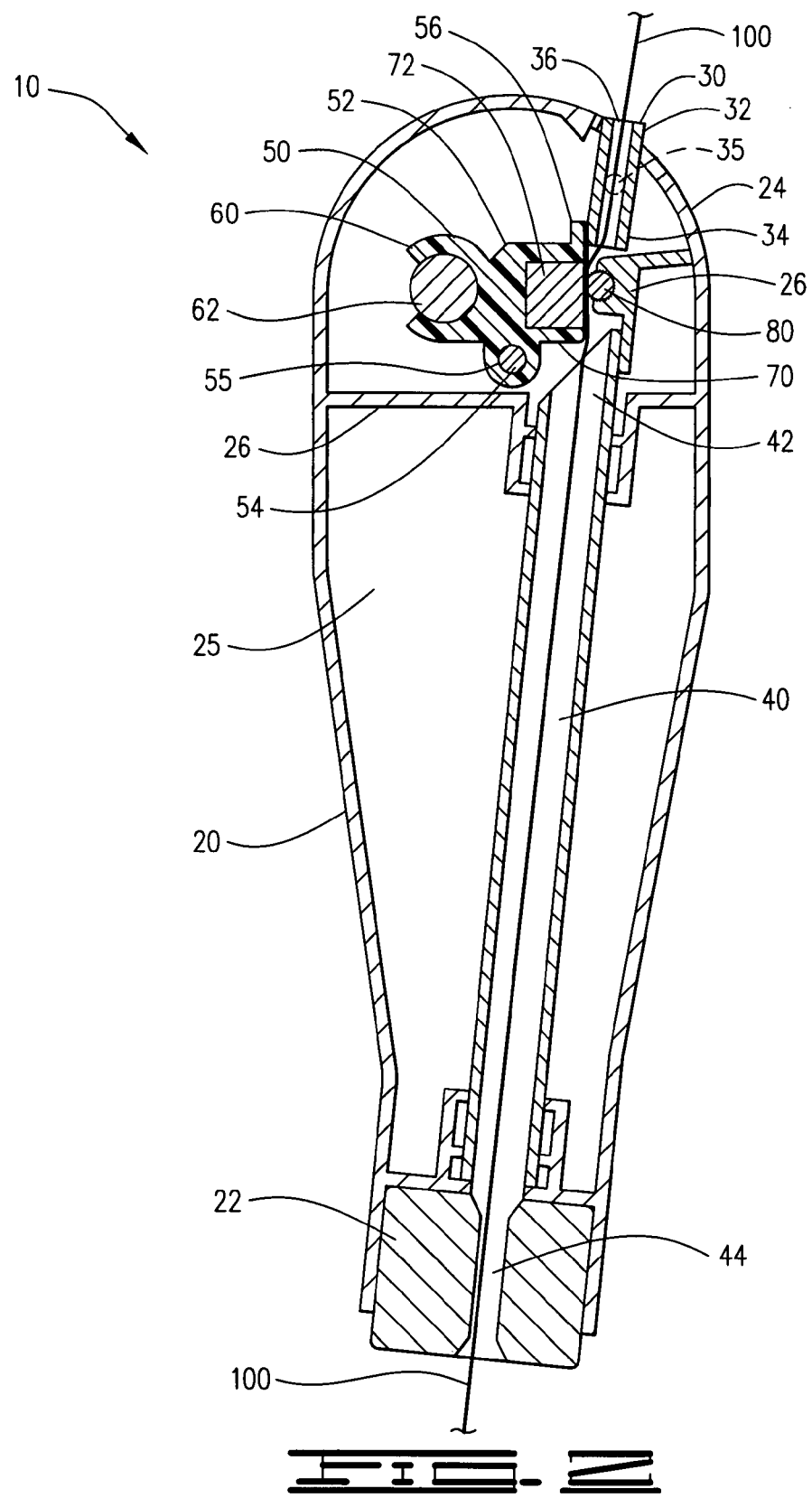
FIG. 2 is a cross sectional view of the fishing float in an open position.
Figure 3:
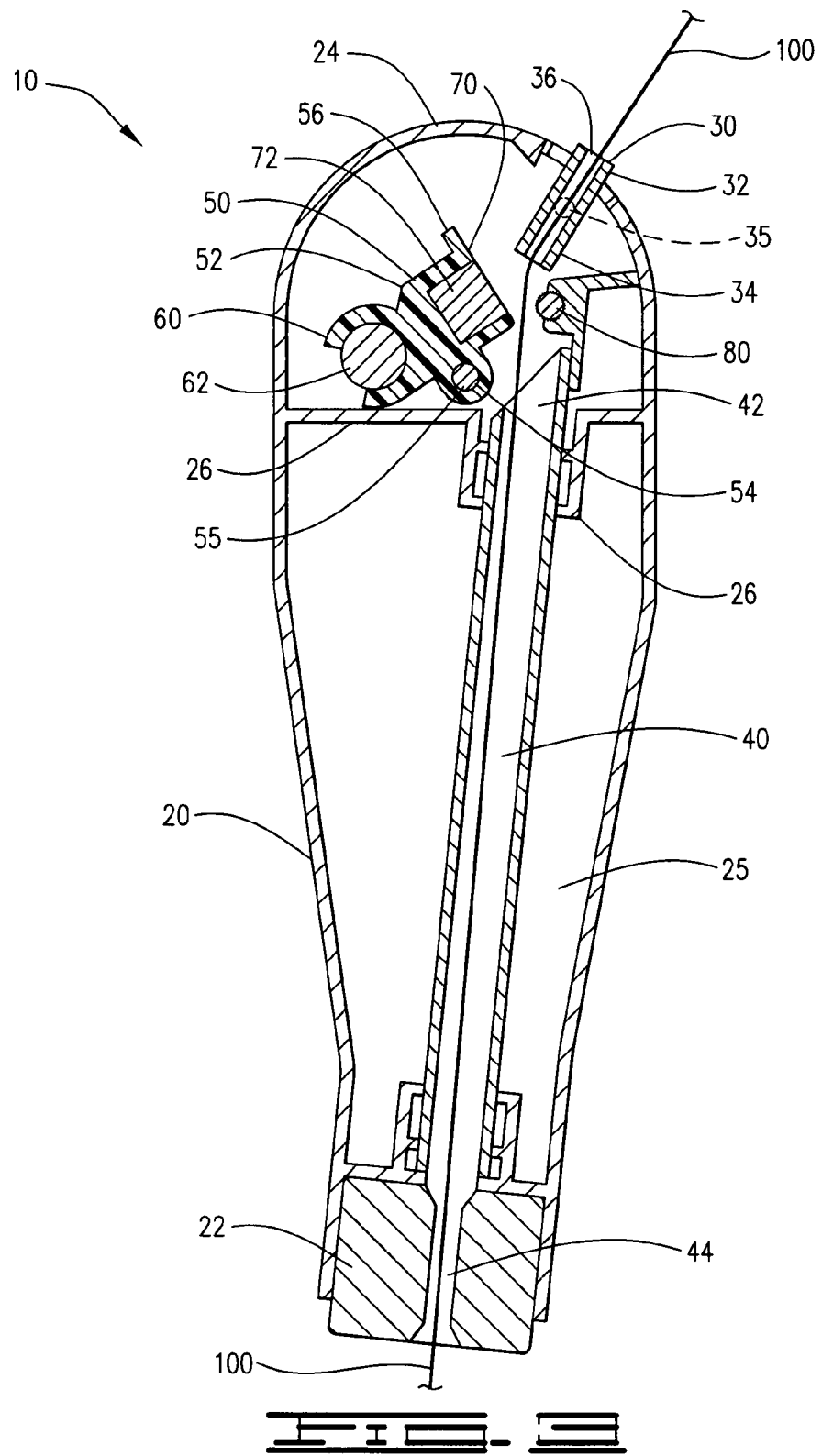
FIG. 3 is a cross sectional view of the fishing float in a locked position.

A fishing float, as shown in FIGS. 1-3 of the drawings, is attached to a fishing line 100 providing adjustment of the depth of the fishing line without having to necessarily reel in the fishing line to perform the adjustment manually, the fishing float 10 comprising a buoyant outer shell 20 having a weighted bottom portion 22 and a top portion 24, said outer shell having a hollow air-filled inner cavity 25 defining an internal longitudinal fishing line channel 40 running through the fishing float 10 from the top portion 24 to the bottom portion 22, the fishing line channel 40 defining an upper end 42 and a lower end 44, a weighted rocker member 50 pivotally attached within the outer shell 20, the rocker member 50 having a rear side portion 60 including a fixed weighted member 62 and a front side portion 70 having a fixed magnetic member 72, a fixed transverse serrated pin 80 located across the fishing line channel 40 to which the fixed magnetic member 72 is magnetically attracted, fixing the position of the fishing line 100 between the magnetic member 72 and the serrated pin 80, and a trigger release member 30 pivotally attached within the upper end 42 of the fishing line channel 40, the trigger release member 30 defining a central bore 36 through which the fishing line 100 is placed, wherein said trigger release member 30, when pivoted forward by a tug on the fishing line 100, releases the magnetic engagement between the magnetic member 72 of the weighted rocker member 70 from the serrated pin 80 releasing the fishing line 100 within the fishing line channel 40.

FIG. 2 specifically shows the fishing float 10 in a closed position, with the magnetic member 72 capturing the fishing line 100 against the serrated pin 80, fixing the fishing line 100 within the fishing float 10. FIG. 3 shows the fishing float 10 in an open position, wherein the fishing line 100 is free to travel between the magnetic member 72 and the serrated pin 80 through the fishing line channel 40 within the fishing float 10.

The rocker member 50 further defines a central axis 52 defining a transverse pivot pin bore 54 through which a pivot pin 55 is placed, held within the inner cavity 25 by an inner frame 26, with the front side portion 70 directed towards the longitudinal fishing line channel 40, the front side portion defining an upper extension tab 56. The trigger release member 30 further defines a transverse pivot pin 35 pivotally attaching the trigger release member 30 within the upper end 42 of the longitudinal fishing line channel 40. When the upper end 32 of the trigger release member 30 is pivoted downward by a quick tug on the fishing line 100, the lower end 34 of the trigger release member 30 is forced against the upper extension tab 56 of the rocker member 50, urging the rocker member 50 away from the longitudinal fishing line channel 40, breaking contact between the magnetic member 72 and the serrated pin 80. A gentle pull on the fishing line 100 will tilt the fishing float 10, allowing the front side portion 70 of the rocker member 50 containing the magnetic member 72 to pivot towards the longitudinal fishing channel 40, allowing the magnetic member to connect to the serrated pin 80, binding the fishing line caught between the magnetic member 72 and the serrated pin 80.

While the invention has been particularly shown and described with reference to a preferred embodiment thereof, it will be understood by those skilled in the art that changes in form and detail may be made therein without departing from the spirit and scope of the invention.

What is claimed is:

1. A fishing float attached to a fishing line providing adjustment of a depth of an end of the fishing line without having to necessarily reel in the fishing line to perform the adjustment manually, said fishing float comprising:
    a buoyant outer shell having a weighted bottom portion and a top portion, said outer shell defining a hollow air-filled inner cavity, an internal longitudinal fishing line channel running through said fishing float from said top portion to said bottom portion, said fishing line channel further defining an upper end and a lower end;
    a weighted rocker member pivotally attached within said outer shell, said rocker member defining a rear side portion including a fixed weighted member and a front side portion having a fixed magnetic member;
    a fixed transverse serrated pin located across said fishing line channel to which said fixed magnetic member is magnetically attracted, capturing said fishing line between said magnetic member and said serrated pin; and
    a trigger release member pivotally attached within said upper end of said fishing line channel, said trigger release member defining a central bore through which said fishing line is placed, wherein said trigger release member, when pivoted by a forced tug on said fishing line, releases a magnetic engagement between said magnetic member of said weighted rocker member from said serrated pin releasing said fishing line within said fishing line channel, while a gentle pull applied to said fishing line rocks said entire fishing float forward, tilting said rocker member towards said serrated pin, engaging said magnetic member against said serrated pin.

2. The fishing float, as disclosed in claim 1, further comprising:
    said rocker member defining a central axis including a transverse pivot pin bore through which a pivot pin is placed, held within the inner cavity by an inner frame, with the front side portion directed towards the longitudinal fishing line channel, the front side portion defining an upper extension tab; and
    said trigger release member further defines a transverse pivot pin pivotally attaching the trigger release member within the upper end of the longitudinal fishing line channel, wherein an upper end of the trigger release member is pivoted downwardly by the forced tug on the fishing line, a lower end of the trigger release member is forced against the upper extension tab of the rocker member, knocking the rocker member away from the longitudinal fishing line channel, breaking contact between the magnetic member and the serrated pin, while the gentle pull on the fishing line will tilt the fishing float, allowing the front side portion of the rocker member containing the magnetic member to pivot towards the longitudinal fishing channel, allowing the magnetic member to connect to the serrated pin, binding the fishing line caught between the magnetic member and the serrated pin.

* * * * *